(12) United States Patent
Notagashira

(10) Patent No.: US 6,619,803 B2
(45) Date of Patent: Sep. 16, 2003

(54) COLOR PROJECTOR APPARATUS HAVING MEANS FOR PREVENTING DEGRADATION IN IMAGE QUALITY DUE TO HEAT

(75) Inventor: Hidefumi Notagashira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/157,556

(22) Filed: May 29, 2002

(65) Prior Publication Data

US 2003/0007133 A1 Jan. 9, 2003

(30) Foreign Application Priority Data

May 29, 2001 (JP) ........................................ 2001-161340
May 24, 2002 (JP) ........................................ 2002-151625

(51) Int. Cl.[7] ...................... G03B 21/00; G03B 21/14; G03B 21/16; G02F 1/1335; G02F 1/03
(52) U.S. Cl. ......................... 353/31; 353/20; 353/52; 349/9; 359/246; 359/249; 359/259; 359/497
(58) Field of Search ......................... 353/20, 31, 33, 353/52, 81; 349/5, 8, 9; 359/246, 249, 259, 627, 495, 497

(56) References Cited

U.S. PATENT DOCUMENTS

| | | | |
|---|---|---|---|
| 6,111,700 A | * 8/2000 | Kobayashi et al. | ......... 359/627 |
| 6,137,635 A | * 10/2000 | Nakazawa | .................. 359/621 |
| 6,359,721 B1 | 3/2002 | Fujimori | ..................... 359/246 |
| 6,414,781 B1 | 7/2002 | Saitoh | ........................ 359/245 |
| 6,523,958 B2 | * 2/2003 | Takezawa et al. | ............ 353/20 |
| 6,530,665 B2 | * 3/2003 | Takizawa et al. | ........... 353/119 |
| 6,540,360 B2 | * 4/2003 | Furuhata et al. | ............... 353/31 |

FOREIGN PATENT DOCUMENTS

EP 1 016 894 A2 7/2000 ......... G02F/1/1333

OTHER PUBLICATIONS

Patent Abstracts of Japan, Publication No. 2000 206507, Publication Date Jul. 28, 2000.
Patent Abstracts of Japan, Publication No. 2000 075408, Publication Date Mar. 14, 2000.
Patent Abstracts of Japan, Publication No. 07 248480, Publication Date Sep. 26, 1995.
Patent Abstracts of Japan, Publication No. 2001 075070, Publication Date Mar. 23, 2001.

* cited by examiner

Primary Examiner—Russell Adams
Assistant Examiner—Melissa J Koval
(74) Attorney, Agent, or Firm—Morgan & Finnegan LLP

(57) ABSTRACT

Disclosed is a projector apparatus including a color separation optical system which separates illumination light into a plurality of color light components, a plurality of image forming panels illuminated with the plurality of color light components, respectively, a color synthesis optical system which synthesizes the light components from the plurality of image forming panels illuminated, a projecting optical system which projects light from the color synthesis optical system, and transparent substrates each arranged on at least one of incident and exit surface sides of the plurality of image forming panels, each of the transparent substrates holding a polarizer, wherein a surface area of at least one of the plurality of transparent substrates is larger than those of the remaining transparent substrates.

20 Claims, 14 Drawing Sheets

HEAT LOAD : a>b>c

HEAT CONDUCTIVITY : A>B IN SUBSTRATE MATERIALS A AND B

|   | a | b | c |
|---|---|---|---|
| 1 | A | A | B |
| 2 | A | B | B |
| 3 | B | A | A |
| 4 | B | A | B |

HEAT LOAD: d>e>f

HEAT CONDUCTIVITY: C>D IN SUBSTRATE MATERIALS C AND D

| | d | e | f |
|---|---|---|---|
| 5 | C | C | D |
| 6 | C | D | D |
| 7 | C | D | C |
| 8 | D | D | C |

COLOR PROJECTOR APPARATUS HAVING MEANS FOR PREVENTING DEGRADATION IN IMAGE QUALITY DUE TO HEAT

BACKGROUND OF THE INVENTION

1. Field of the Invention

The present invention relates to a projector apparatus for displaying an enlarged computer image or video image.

2. Related Background Art

In recent years, image display apparatuses such as liquid crystal projectors are required to improve brightness. FIG. 15 shows the arrangement of a conventional projecting image display apparatus (projector apparatus).

Referring to FIG. 15, white light emitted from a light source section 101 of an ultrahigh-pressure mercury-vapor lamp is reflected by a reflector 102 and transmitted through fly-eye lenses 103 and 104. The direction of polarization is aligned through a PS conversion element 105 by a mirror which separates light into p-polarized light and s-polarized light and a λ/2-plate which changes the polarization direction. The light that emerges from the PS conversion element 105 passes through a condenser lens 106 and the like. After that, a red-band light component is transmitted through a dichroic mirror DM101. Green- and blue-band light components are reflected by the dichroic mirror DM101. The blue-band light component is transmitted through a dichroic mirror DM102. The green-band light component is reflected by the dichroic mirror DM102. With this arrangement, the illumination light is separated into the light components in the red, green, and blue bands.

Each color light component becomes incident on a corresponding one of liquid crystal display elements 109R, 109G, and 109B and is modulated. These color light components are synthesized by a dichroic prism 111 and enlarged and projected onto a projection surface by a projecting lens 112.

Each dolor band will be described in more detail. The red-band light component transmitted through the dichroic mirror DM101 is changed in its optical path by 90° by a reflecting mirror M101, passes through a field lens 107R, becomes incident on an incident-side polarizing plate 108RI and liquid crystal display element 109R, and is modulated here.

The modulated red-band light component strikes an exit-side polarizing plate 110RO and dichroic prism 111 in this order. The optical path is changed by 90° by the dichroic prism 111. Then, the light component becomes incident on the projecting lens 112. The dichroic prism 111 is formed by bonding four prisms with adhesive such that it has an almost cross-shaped wavelength selection reflecting layer.

On the other hand, the green- and blue-band light components reflected and changed in their operation paths by 90° by the dichroic mirror DM101 become incident on the dichroic mirror DM102. The dichroic mirror DM102 has a characteristic for reflecting a green-band light component G. Hence, the green-band light component is reflected and changed in its optical path by 90° by the dichroic mirror DM102, transmitted through a field lens 107G, becomes incident on an incident-side polarizing plate 108GI and liquid crystal display element 109G, and is modulated here.

The modulated green-band light component strikes an exit-side polarizing plate 110GO and dichroic prism 111 in this order, passes through the dichroic prism 111, and becomes incident on the projecting lens 112.

The blue-band light component transmitted through the dichroic mirror DM102 passes through a condenser lens 113, relay lens 114, reflecting mirrors M102 and M103, and field lens 107B, becomes incident on an incident-side polarizing plate 108BI and liquid crystal display element 109B, and is modulated here.

The modulated blue-band light component strikes an exit-side polarizing plate 110BO and dichroic prism 111 in this order, is changed in its optical path by 90° by the dichroic prism 111, and becomes incident on the projecting lens 112.

The light components in the respective color bands, which are incident on the projecting lens 112 in the above-described manner, are projected onto the projection surface and displayed as an enlarged image.

In the above-described conventional projecting image display apparatus, a polarizing plate is normally formed by bonding a film-shaped polarizer b to transparent substrate a, as shown in FIG. 16, such that a predetermined polarizing characteristic can be exhibited. Both the incident-side polarizing plates and the exit-side polarizing plates are formed by bonding predetermined polarizers to transparent substrates, which have identical shapes independently of colors, for the respective color bands.

An incident-side polarizing plate absorbs light having a rotating polarization axis and converts the light into heat to align the polarization direction of light that becomes incident on a liquid crystal display element. In an exit-side polarizing plate, when the display color is black, the polarization axis of the polarizing plate is perpendicular to the amplitude of light emerging from a liquid crystal display element. Since all light components are absorbed and converted into heat, the heat load is very high.

If the aperture ratio of a liquid crystal display element is low, and the light amount of a lamp to be used is small, transparent substrates, e.g., glass substrates (the heat conductivity is about 1.2 W/(m·K)) having identical shapes suffice, as in the prior art.

Recently, 1.3 inches liquid crystal display elements have an aperture ratio of 60% even though the number of pixels is about 770,000. Some liquid crystal display elements improve the brightness of a projected image by increasing the power consumption of a lamp. Liquid crystal display elements themselves are also becoming compact.

The heat load changes for each color band and also depending on whether the polarizing plate is on the incident side or exit side. For example, when color purity of at least one of a plurality of color bands should be changed, the heat load on the incident- or exit-side polarizing plate of a specific color band increases. For this reason, the heat load on some incident- or exit-side polarizing plates increases, resulting in degradation in performance of the polarizing plate.

To solve the problem of heat load on a polarizing plate, sapphire whose heat conductivity (42 W/(m·K)) is about 40 times higher than that of a transparent glass substrate is used as a substrate to which a polarizer is bonded, as is proposed in Japanese Patent Application Laid-Open No. 11-231277.

However, sapphire is expensive. Use of sapphire is preferably avoided as much as possible from the viewpoint of cost. Especially, a 3-plate projecting image display apparatus as shown in FIG. 15 uses a total of six polarizing plates on the incident and exit sides. Since a plurality of sapphire substrates are normally required, the cost largely increases.

In addition, to increase the cooling efficiency by a cooling fan, the power consumption of the cooling fan increases, or noise becomes large.

SUMMARY OF THE INVENTION

The present invention has been made to solve the above problems, and has as its object to provide a projector apparatus which can reduce cost while reliably preventing any degradation in image quality due to heat by effectively transmitting heat of a polarizing plate to a transparent substrate in correspondence with the heat load on the polarizer and efficiently radiating the heat by the transparent substrate.

In order to achieve the above object, according to the present invention, there is provided a projector apparatus comprising:

a color separation optical system which separates illumination light into a plurality of color light components;

a plurality of image forming panels illuminated with the plurality of color light components, respectively;

a color synthesis optical system which synthesizes the light components from the plurality of image forming panels illuminated;

a projecting optical system which projects light from the color synthesis optical system; and transparent substrates each arranged on at least one of incident and exit surface sides of the plurality of image forming panels, each of the transparent substrates holding a polarizer, wherein a thickness of at least one of the plurality of transparent substrates is larger than those of the remaining transparent substrates.

In the present invention, the thickness of the at least one transparent substrate is preferably not less than 1.2 times larger than those of the remaining transparent substrates.

In order to achieve the above object, according to the present invention, there is also provided a projector apparatus comprising:

a color separation optical system which separates illumination light into a plurality of color light components;

a plurality of image forming panels illuminated with the plurality of color light components, respectively;

a color synthesis optical system which synthesizes the light components from the plurality of image forming panels illuminated;

a projecting optical system which projects light from the color synthesis optical system; and transparent substrates each arranged on at least one of incident and exit surface sides of the plurality of image forming panels, each of the transparent substrates holding a polarizer, wherein an area ratio of at least one of the plurality of transparent substrates to a polarizer held by the at least one transparent substrate is larger than area ratios of the remaining transparent substrates to polarizers held by the remaining transparent substrates.

In the present invention, the area ratio of the at least one transparent substrate to the polarizer held by the at least one transparent substrate is not less than 1.2 times larger than the area ratios of the remaining transparent substrates to the polarizers held by the remaining transparent substrates.

According to the present invention, there is also provided a projector apparatus comprising:

a color separation optical system which separates illumination light into a plurality of color light components;

a plurality of image forming panels illuminated with the plurality of color light components, respectively;

a color synthesis optical system which synthesizes the light components from the plurality of image forming panels illuminated;

a projecting optical system which projects light from the color synthesis optical system; and transparent substrates each arranged on at least one of incident and exit surface sides of the plurality of image forming panels, each of the transparent substrates holding a polarizer, wherein an area of at least one of the plurality of transparent substrates is larger than those of the remaining transparent substrates.

In the present invention, the area of the at least one transparent substrate is not less than 1.2 times larger than those of the remaining transparent substrates.

According to the present invention, there is also provided a projector apparatus comprising:

a color separation optical system which separates illumination light into a plurality of color light components;

a plurality of image forming panels illuminated with the plurality of color light components, respectively;

a color synthesis optical system which synthesizes the light components from the plurality of image forming panels illuminated;

a projecting optical system which projects light from the color synthesis optical system; and transparent substrates each arranged on at least one of incident and exit surface sides of the plurality of image forming panels, each of the transparent substrates holding a polarizer, wherein a surface area of at least one of the plurality of transparent substrates is larger than those of the remaining transparent substrates.

In the present invention, the at least one transparent substrate has a shape with a curvature, and the remaining transparent substrates have a planar shape.

In the present invention, the plurality of transparent substrates are essentially formed from a material selected from the group consisting of sapphire, fluorite, and glass.

Additionally, in the present invention, the at least one of the plurality of transparent substrates and the remaining transparent substrates are essentially formed from different materials selected from the group consisting of sapphire, fluorite, and glass.

Furthermore, in the present invention, the at least one transparent substrate of the plurality of transparent substrates is essentially formed from a material selected from the group consisting of sapphire, fluorite, and glass, and the remaining transparent substrates are essentially formed from one or two materials which are different from the material of the at least one transparent substrate and are selected from the group consisting of sapphire, fluorite, and glass.

The above and other objects, features, and advantages of the present invention will become apparent in the embodiments to be described later in conjunction with the accompanying drawings.

DETAILED DESCRIPTION OF THE PREFERRED EMBODIMENTS

Figure 1:
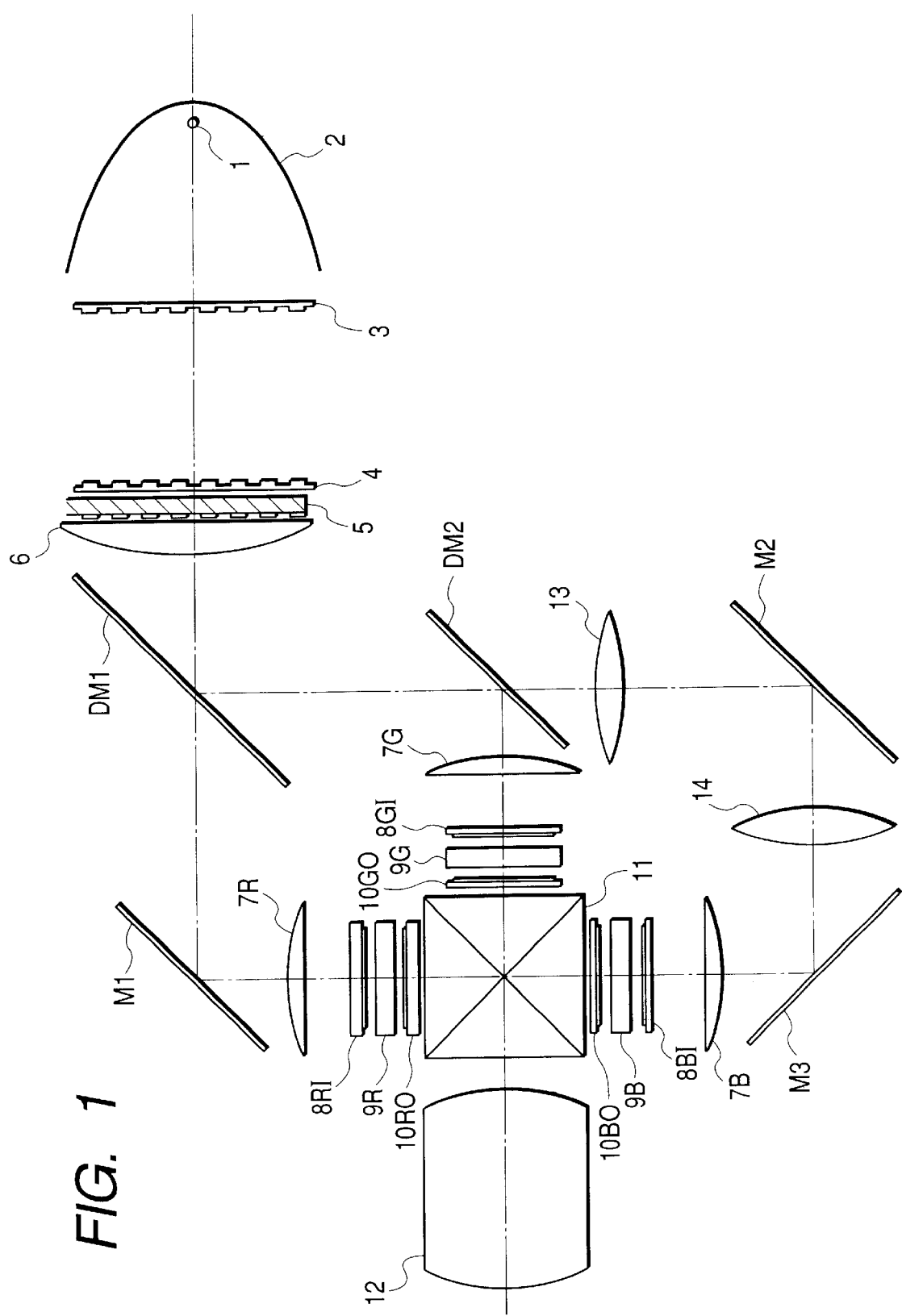
FIG. 1 is a view showing the optical arrangement of a projecting image display apparatus (projector apparatus) according to the first embodiment of the present invention.

FIG. 1 shows the optical arrangement of a projecting image display apparatus (projector apparatus) according to the first embodiment of the present invention.

Referring to FIG. 1, white illumination light emitted from a light source section 1 of an ultrahigh-pressure mercury-vapor lamp is reflected by a reflector 2 and transmitted through fly-eye lenses 3 and 4. The direction of polarization is aligned through a PS conversion element 5 by a mirror which separates light into p-polarized light and s-polarized light and a λ/2-plate which changes the polarization direction. The light that emerges from the PS conversion element 5 passes through a condenser lens 6 and the like. After that, a red-band light component is transmitted through a dichroic mirror DM1. Green- and blue-band light components are reflected by the dichroic mirror DM1. The blue-band light component is transmitted through a dichroic mirror DM2. The green-band light component is reflected by the dichroic mirror DM2. With this arrangement, the illumination light is separated into the light components in the red, green, and blue bands. The dichroic mirrors form a color separation optical system.

Each color light component becomes incident on a corresponding one of liquid crystal display elements 9R, 9G, and 9B to form each color image. The color images are synthesized by a dichroic prism 11 serving as a color synthesis optical system and then projected onto a projection surface (screen) (not shown) by a projecting lens 12 serving as a projecting optical system. Each of the above liquid crystal display elements is an image forming panel such as a liquid crystal display panel. A transmission-type image forming panel for passing light to form an image is used.

Each color band will be described in more detail. The red-band light component transmitted through the dichroic mirror DM1 is changed in its optical path by 90° by a reflecting mirror M1, passes through a field lens 7R, and becomes incident on an incident-side polarizing plate 8RI and liquid crystal display element 9R. The liquid crystal display element 9R is driven in accordance with image information supplied from an image information supply apparatus (e.g., a personal computer, TV, video tape recorder, or DVD player) (not shown) and modulates the red-band light component incident thereon.

The modulated red-band light component strikes an exit-side polarizing plate 10RO and dichroic prism 11 in this order. The optical path is changed by 90° by the dichroic prism 11. Then, the light component becomes incident on the projecting lens 12. The dichroic prism 11 is a so-called cross dichroic prism formed by bonding four prisms with adhesive such that it has an almost cross-shaped wavelength selection reflecting (dichroic) layer. In place of the cross dichroic prism, a so-called 3P (3-piece) or a 4P (4-piece) prism formed by bonding three or four prisms having different shapes may be used. The cross dichroic prism, 3P (3-piece) prism, or 4P (4-piece) prism constructs a color synthesis optical system.

On the other hand, the green- and blue-band light components reflected and changed in their operation paths by 90° by the dichroic mirror DM1 become incident on the dichroic mirror DM2. The dichroic mirror DM2 has a characteristic for reflecting a green-band light component G. Hence, the green-band light component is reflected and changed in its optical path by 90° by the dichroic mirror DM2, transmitted through a field lens 7G, and becomes incident on an incident-side polarizing plate 8GI and liquid crystal display element 9G. The liquid crystal display element 9G is driven in accordance with image information supplied from an image information supply apparatus (not shown) and modulates the green-band light component incident thereon.

The modulated green-band light component strikes an exit-side polarizing plate 10GO and dichroic prism 11 in this order, passes through the dichroic prism 11, and becomes incident on the projecting lens 12.

The blue-band light component transmitted through the dichroic mirror DM2 is transmitted through a condenser lens 13, changed in its optical path by 90° by a reflecting mirror M2, transmitted through a relay lens 14, changed in its optical path by 90° again by a reflecting mirror M3, transmitted through a field lens 7B, and becomes incident on an incident-side polarizing plate 8BI and liquid crystal display element 9B. The liquid crystal display element 9B is driven in accordance with image information supplied from an image information supply apparatus (not shown) and modulates the blue-band light component incident thereon.

The modulated blue-band light component strikes an exit-side polarizing plate 10BO and dichroic prism 11 in this order, is changed in its optical path by 90° by the dichroic prism 11, and becomes incident on the projecting lens 12.

The light components in the respective color bands, which are synthesized by the dichroic prism 11, are projected onto the projection surface (screen) (not shown) by the projecting lens 12 and displayed as an enlarged image.

When the color purity of the red band is reduced (when another color band near the red band is also included), a bright image is obtained. In this case, however, the heat load on the polarizing plate arranged in the optical path of the red band increases.

Figure 2:
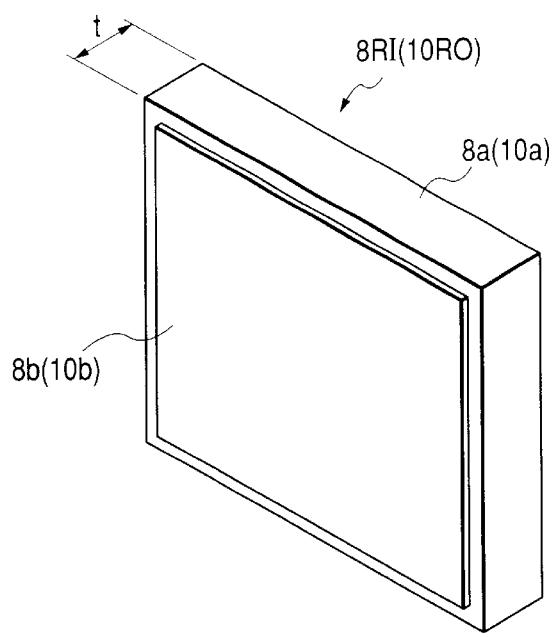
FIG. 2 is a perspective view showing the structure of a red-band polarizing plate in the projecting image display apparatus according to the first embodiment.

A measure against this will be described below. As shown in FIG. 2, in the incident-side polarizing plate 8RI (exit-side polarizing plate 10RO) which passes a red-band light component, a polarizer 8b (10b) is bonded to (held by) a transparent substrate 8a (10a) such that a predetermined polarizing characteristic can be exhibited. If the transparent substrates corresponding to the red-, green-, and blue-band light components are to be made of the same material such as fluorite, a thickness t of the transparent substrate which passes the red-band light component is set to be larger than that of the transparent substrate of the incident-side polarizing plate 8GI or exit-side polarizing plate 10GO which passes the green-band light component or the incident-side polarizing plate 8BI or exit-side polarizing plate 10BO which passes the blue-band light component.

Figure 3:
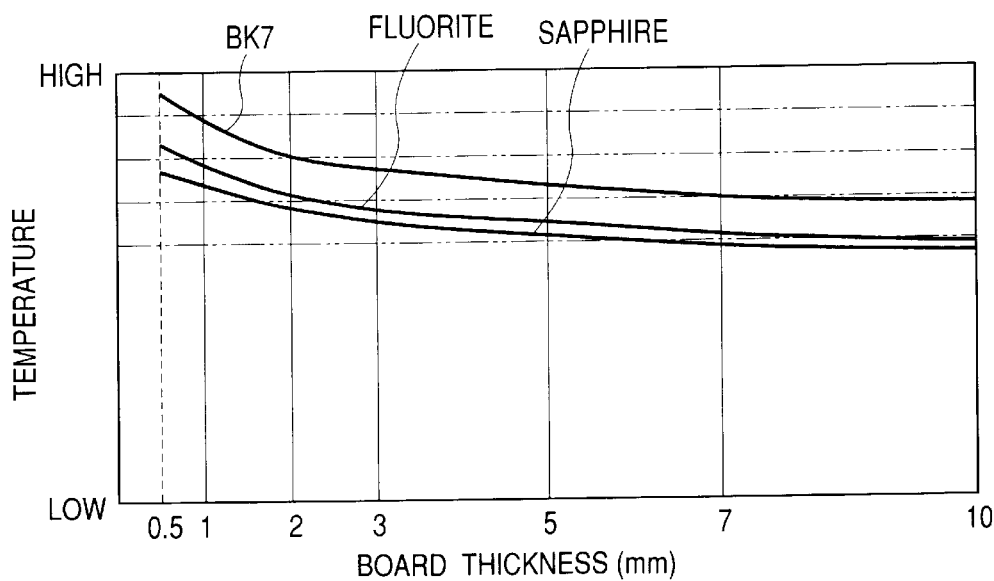
FIG. 3 is a graph showing the relationship between the thickness of a transparent substrate and the temperature of the bonding interface of a polarizer in the projecting image display apparatus according to the first embodiment.

The relationship between the thickness of a transparent substrate and the temperature of the bonding interface of a polarizer will be described with reference to FIG. 3. FIG. 3 shows the relationship between the thickness of a transparent substrate and the temperature of the bonding interface of a polarizer when a polarizer having a predetermined area is bonded to a transparent substrate having a predetermined area, and the polarizer generates predetermined heat. FIG. 3 shows the relationship for each of cases wherein the transparent substrates are formed from glass (BK7: heat conductivity: about 1.2 W/(m·K)), the transparent substrates are formed from fluorite (heat conductivity: about 9.7 W/(m·K)), and the transparent substrates are formed from sapphire (heat conductivity: 42 W/(m·K)).

The result shown in FIG. 3 is obtained when only cooling by natural convection of air is executed without forcible cooling.

As is apparent from FIG. 3, if the transparent substrates are made of the same material, the maximum temperature becomes lower as the board thickness of the transparent substrate increases. That is, to prevent any degradation in performance due to heat of the polarizer, a large board thickness is more advantageous. The result obtained when a polarizer is bonded to a sapphire substrate having a board thickness of 0.5 mm is the same as the result obtained when a polarizer is bonded to a fluorite substrate having a board thickness of 1.1 mm.

As is apparent from this fact, even when the transparent substrate 8a (10a) of the incident-side polarizing plate 8RI or exit-side polarizing plate 10RO which passes the red-band light component is made of fluorite, the heat load can be sufficiently relaxed by making the board thickness of the transparent substrate larger than those of the remaining transparent substrates. More specifically, when the transparent substrate which passes the red-band light component is thicker than the transparent substrates which pass the remaining band light components by about 20% (about 1.2 times), the difference becomes conspicuous.

In this embodiment, the fluorite transparent substrates used for the incident- and exit-side polarizing.plates arranged in the optical path of the red-band light component are made thicker than the fluorite transparent substrates used for the incident- and exit-side polarizing plates arranged in the optical paths of the remaining band light components. However, the transparent substrates of the incident- and exit-side polarizing plates arranged in the optical path of the green- or blue-band light component, for which the heat load increases due to the cooling air channel or the like, may be made thicker than those for the remaining band light components.

In addition, of the incident- and exit-side polarizing plates, only the transparent substrate of a polarizing plate with a high heat load may be thick.

The material of the transparent substrate is not limited to fluorite. A glass transparent substrate may be used depending on the degree of heat load. In this case as well, when the board thickness is increased by about 20%, the difference becomes conspicuous, as is apparent from FIG. 3.

In the above-described embodiment, the board thickness of a transparent substrate is changed in accordance with heat load whereby the heat of the polarizing plate can be effectively transmitted to the transparent substrate and efficiently radiated by the transparent substrate.

Combinations of heat load and the materials and board thicknesses of transparent substrates when one of a plurality of transparent substrates is formed from a material different from that of the remaining transparent substrates will be described with reference to FIGS. 4A and 4B and FIGS. 5A and 5B. Two or three kinds of materials are used.

Figures 4A, 4B:
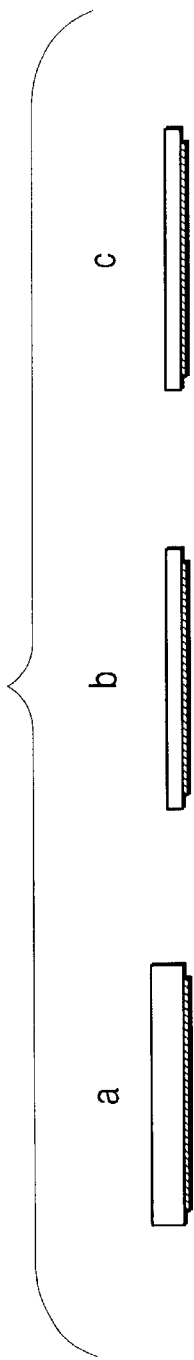
FIGS. 4A and 4B are views showing combinations of heat load and the materials and thicknesses of transparent substrates in the projecting image display apparatus according to the first embodiment of the present invention.

Referring to FIG. 4A, incident- or exit-side polarizing plates a, b, and c are arranged in three optical paths of light components separated into three colors, respectively. For each polarizing plate, a polarizer is bonded to a transparent substrate.

Assume that the heat load on the respective polarizing plates increases in an order of a, b, and c (in the polarizing plates a, b, and c, the polarizing plate a has the highest heat load, and the polarizing plate c has the lowest heat load). The transparent substrate of the polarizing plate a is thicker (e.g., thicker by 1.2 times or more) than those of the polarizing plates b and c.

FIG. 4B shows effective combinations when two or more kinds of materials are used for transparent substrates with the above arrangement. FIG. 4B shows a table of combinations when materials A and B (heat conductivity: A>B) are employed for the transparent substrates of the polarizing plates a, b, and c shown in FIG. 4A. As one case, sapphire is used as the material A, and fluorite (and/or glass) is used as the material B. As another case, sapphire (and/or fluorite) is used as the material A, and glass is used as the material B. There are choices of combinations 1 to 4. An optimum combination is selected in accordance with the situation of heat load or the degree of freedom in design. For example, in combination 2, the transparent substrate used for the polarizing plate a is made of sapphire, i.e., the material A, and the transparent substrates used for the polarizing plates b and c are made of fluorite (or glass), i.e., the material B. Alternatively, the transparent substrate used for the polarizing plate a is made of sapphire, i.e., the material A, the transparent substrate used for the polarizing plate b is made of fluorite, i.e., the material B, and the transparent substrate used for the polarizing plate c is made of glass, i.e., the material B.

If the heat load on a given polarizing plate is very high, a sapphire substrate is used only for the transparent substrate of that polarizing plate, and the board thickness of the transparent substrate is increased. With this arrangement, the polarizing plate can reliably stand the high heat load.

Combinations when transparent substrates are thick in two optical paths will be described next.

Figures 5A, 5B:
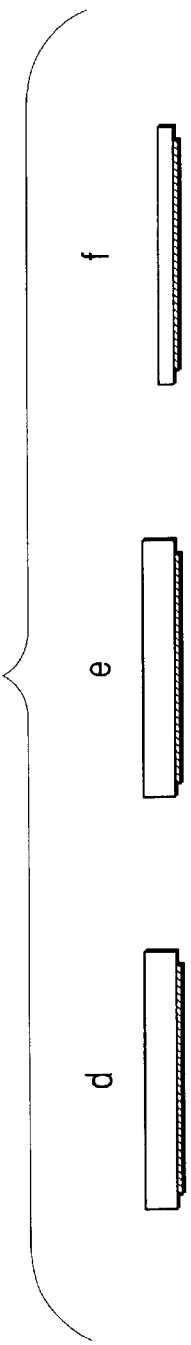
FIGS. 5A and 5B are views showing other combinations of heat load and the materials and thicknesses of transparent substrates in the projecting image display apparatus according to the first embodiment of the present invention.

Referring to FIG. 5A, incident- or exit-side polarizing plates d, e, and f are arranged in three optical paths of light components separated into three colors, respectively. For each polarizing plate, a polarizer is bonded to a transparent substrate.

Assume that the heat load on the respective polarizing plates increases in an order of d, e, and f (in the polarizing plates d, e and f, the polarizing plate d has the highest heat load, and the polarizing plate f has the lowest heat load). The transparent substrates of the polarizing plates d and e are thicker (e.g., thicker by 1.2 times or more) than that of the polarizing plate f.

FIG. 5B shows effective combinations when two or more kinds of materials are used for transparent substrates with the above arrangement. FIG. 5B shows a table of combinations when materials C and D (heat conductivity: C>D) are employed for the transparent substrates of the polarizing plates d, e, and f shown in FIG. 5A. As one case, sapphire is used as the material C, and fluorite (and/or glass) is used as the material D. As another case, sapphire (and/or fluorite) is used as the material C, and glass is used as the material D. There are choices of combinations 5 to 8. An optimum combination is selected in accordance with the situation of heat load or the degree of freedom in design. For example, in combination 6, the transparent substrate used for the polarizing plate d is made of sapphire, i.e., the material C, and the transparent substrates used for the polarizing plates e and f are made of fluorite, i.e., the material D. Alternatively, the transparent substrate used for the polarizing plate d is made of sapphire, i.e., the material C, the transparent substrate used for the polarizing plate e is made of fluorite (or glass), i.e., the material D, and the transparent substrate used for the polarizing plate f is made of glass (or fluorite), i.e., the material D.

In the above-described embodiment, the material of a transparent substrate is selected, and the board thickness of the transparent substrate is changed in accordance with heat load whereby the heat of the polarizing plate can be effectively transmitted to the transparent substrate and efficiently radiated by the transparent substrate.

Figure 6:
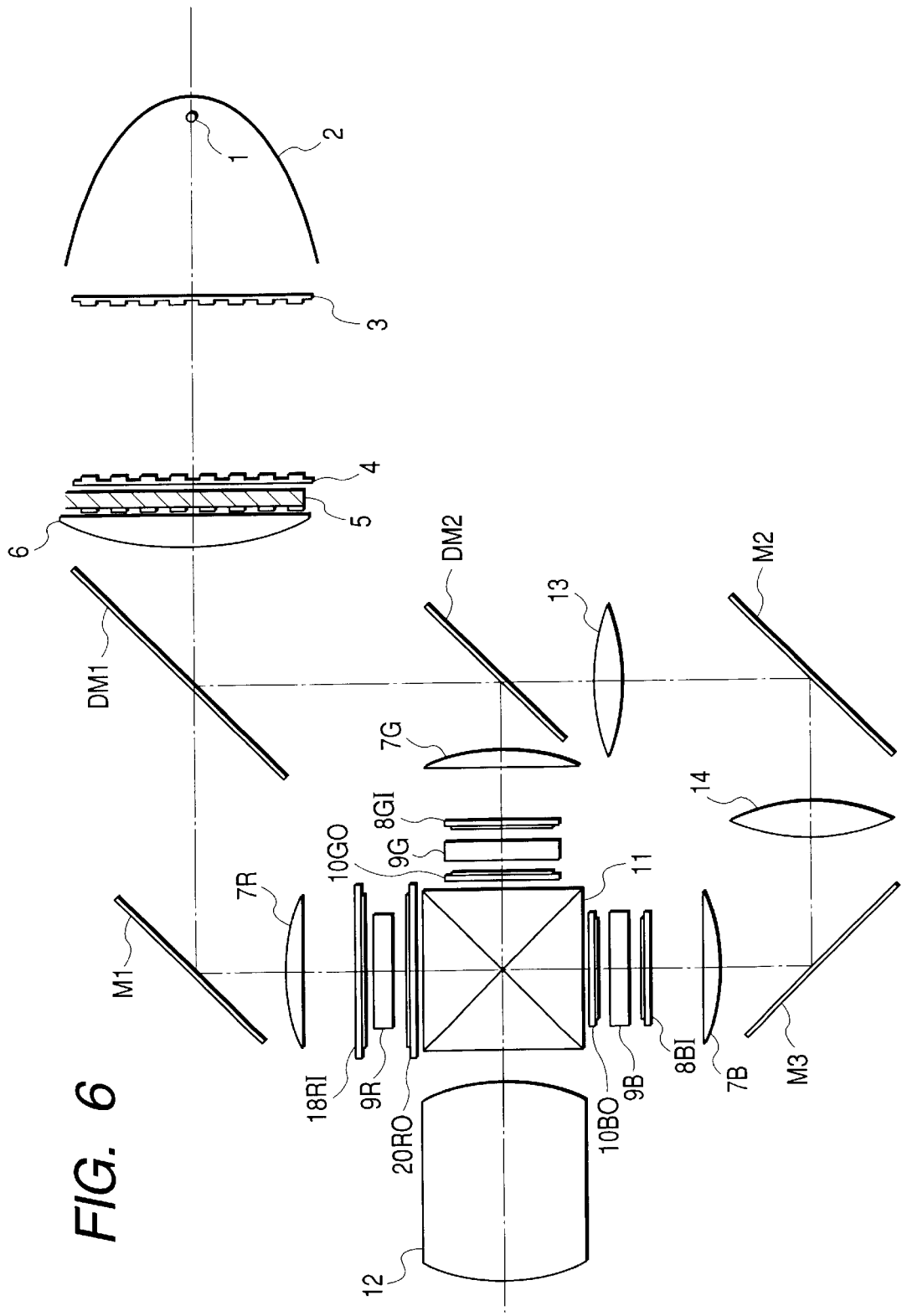
FIG. 6 is a view showing the optical arrangement of a projecting image display apparatus (projector apparatus) according to the second embodiment of the present invention.

FIG. 6 shows the optical arrangement of a projecting image display apparatus (projector apparatus) according to the second embodiment of the present invention. The same reference numerals as in the first embodiment denote the same components in the second embodiment.

Referring to FIG. 6, white light emitted from a light source section 1 of an ultrahigh-pressure mercury-vapor lamp is reflected by a reflector 2 and transmitted through fly-eye lenses 3 and 4. The direction of polarization is aligned through a PS conversion element 5 by a mirror which separates light into p-polarized light and s-polarized light and a λ/2-plate which changes the polarization direction. The light that emerges from the PS conversion element 5 passes through a condenser lens 6 and the like. After that, a dichroic mirror DM1 passes a red-band light component and reflects green- and blue-band light components. The blue-band light component is transmitted through a dichroic mirror DM2. The green-band light component is reflected by the dichroic mirror DM2. With this arrangement, the illumination light is separated into the light components in the red, green, and blue bands. The dichroic mirrors form a color separation optical system.

Each color light component becomes incident on a corresponding one of liquid crystal display elements 9R, 9G, and 9B and is modulated. The color light components are synthesized by a dichroic prism 11 serving as a color synthesis optical system and then projected onto a projection surface (screen) (not shown) by a projecting lens 12 serving as a projecting optical system. Each of the above liquid crystal display elements is an image forming panel such as a liquid crystal display panel. A transmission-type image forming panel for passing light to form an image is used.

Each color band will be described in more detail. The red-band light component transmitted through the dichroic mirror DM1 is changed in its optical path by 90° by a reflecting mirror M1, passes through a field lens 7R, and becomes incident on an incident-side polarizing plate 18RI and liquid crystal display element 9R. The liquid crystal display element 9R is driven in accordance with image information supplied from an image information supply apparatus (e.g., a personal computer, TV, video tape recorder, or DVD player) (not shown) and modulates the red-band light component incident thereon.

The modulated red-band light component strikes an exit-side polarizing plate 20RO and dichroic prism 11 in this order. The optical path is changed by 90° by the dichroic prism 11. Then, the light component becomes incident on the projecting lens 12. The dichroic prism 11 is a so-called cross dichroic prism formed by bonding four prisms with adhesive such that it has an almost cross-shaped wavelength selection reflecting (dichroic) layer. In place of the cross dichroic prism, a so-called 3P (3-piece) or a 4P (4-piece) prism formed by bonding three or four prisms having different shapes may be used. The cross dichroic prism, 3P (3-piece) prism, or 4P (4-piece) prism constructs a color synthesis optical system.

On the other hand, the green- and blue-band light components reflected and changed in their operation paths by 90° by the dichroic mirror DM1 become incident on the dichroic mirror DM2. The dichroic mirror DM2 has a characteristic for reflecting a green-band light component G. Hence, the green-band light component is reflected and changed in its optical path by 90° by the dichroic mirror DM2, transmitted through a field lens 7G, and becomes incident on an incident-side polarizing plate 8GI and liquid crystal display element 9G. The liquid crystal display element 9G is driven in accordance with image information supplied from an image information supply apparatus (not shown) and modulates the green-band light component incident thereon.

The modulated green-band light component strikes an exit-side polarizing plate 10GO and dichroic prism 11 in this order, passes through the dichroic prism 11, and becomes incident on the projecting lens 12.

The blue-band light component transmitted through the dichroic mirror DM2 is transmitted through a condenser lens 13, changed in its optical path by 90° by a reflecting mirror M2, transmitted through a relay lens 14, changed in its optical path by 90° again by a reflecting mirror M3, transmitted through a field lens 7B, and becomes incident on an incident-side polarizing plate 8BI and liquid crystal display element 9B. The liquid crystal display element 9B is driven in accordance with image information supplied from an image information supply apparatus (not shown) and modulates the blue-band light component incident thereon.

The modulated blue-band light component strikes an exit-side polarizing plate 10BO and dichroic prism 11 in this order, is changed in its optical path by 90° by the dichroic prism 11, and becomes incident on the projecting lens 12.

The light components in the respective color bands, which are synthesized by the dichroic prism 11, are projected onto the projection surface (screen) (not shown) by the projecting lens 12 and displayed as an enlarged image.

When the color purity of the red band is reduced (when another color band light near the red band is also included), a bright image is obtained. In this case, however, the heat load on the polarizing plate arranged in the optical path of the red band increases.

Figure 7:
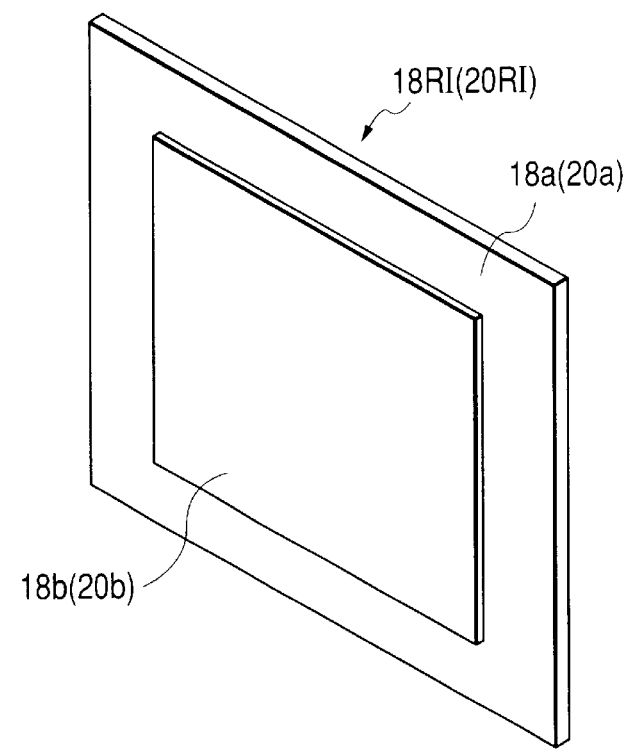
FIG. 7 is a perspective view showing the structure of a red-band polarizing plate in the projecting image display apparatus according to the second embodiment.

A measure against this will be described below. As shown in FIG. 7, in the incident-side polarizing plate 18RI (exit-side polarizing plate 20RO) which passes a red-band light component, a polarizer 18b (20b) is bonded to a transparent substrate 18a (20a) such that a predetermined polarizing characteristic can be exhibited.

If the transparent substrates corresponding to the red-, green-, and blue-band light components are to be made of the same material such as fluorite, the area of a surface of the transparent substrate 18a (20a) which passes the red-band light component, to which the polarizer 18b (20b) is to be bonded, is set to be larger than that of a surface, to which a polarizer is to be bonded, of the transparent substrate of the incident-side polarizing plate 8GI or exit-side polarizing plate 10GO which passes the green-band light component or the incident-side polarizing plate 8BI or exit-side polarizing plate 10BO which passes the blue-band light component.

Figure 8:
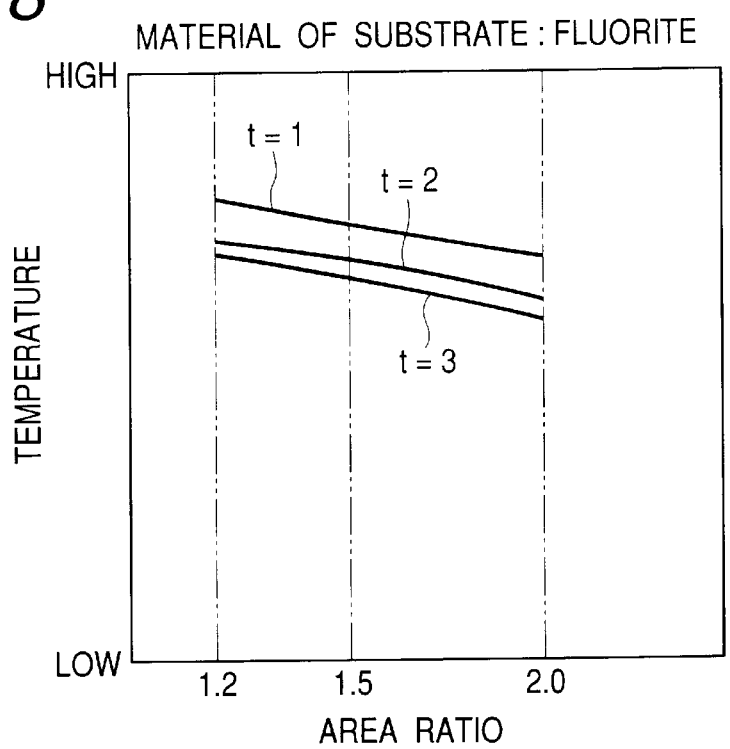
FIG. 8 is a graph showing the relationship between the area ratio of a transparent substrate to a polarizer and the temperature of the bonding interface of a polarizer in the projecting image display apparatus according to the second embodiment.

The relationship between the area ratio of a transparent substrate to a polarizer and the temperature of the surface of the transparent substrate, to which the polarizer is bonded will be described with reference to FIG. 8. FIG. 8 shows the relationship between the area ratio of a transparent substrate to a polarizer (when a polarizer has a predetermined area, the bonding area of the polarizer) and the temperature of the surface of the transparent substrate, to which the polarizer is bonded when a polarizer having a predetermined area is bonded to each of transparent substrates having thicknesses of 1 mm, 2 mm, and 3 mm, and the polarizer generates predetermined heat. The material of a transparent substrate is fluorite.

The result shown in FIG. 8 is obtained when only cooling by natural convection of air is executed without forcible cooling.

As is apparent from FIG. 8, if the transparent substrates have the same thickness, the maximum temperature of the bonding interface becomes lower as the ratio of the area of the bonding interface of the transparent substrate to the area of the polarizer (transparent substrate area/polarizer area) increases. That is, to prevent any degradation in performance due to heat of the polarizer, a high area ratio is more advantageous. The result obtained when a polarizer is bonded to a fluorite substrate having a thickness of 1 mm and an area ratio of 2.0 is the same as the result obtained when a polarizer is bonded to a fluorite substrate having a thickness of 3 mm and an area ratio of 1.2. Even when the material of a transparent substrate is sapphire or glass, the same characteristic as in fluorite can be exhibited.

As is apparent from this fact, even when the transparent substrate 18a (20a) of the incident-side polarizing plate 18RI or exit-side polarizing plate 20RO which passes the red-band light component is made of fluorite, the heat load can be sufficiently relaxed by increasing the area ratio. More specifically, when the area ratio is higher than the area ratios of the transparent substrates which pass the remaining band light components to the polarizers by about 20% (about 1.2 times), the difference becomes conspicuous.

In this embodiment, the area ratio of the fluorite transparent substrates used for the incident- and exit-side polarizing plates arranged in the optical path of the red-band light component to the polarizers bonded to the transparent substrates is made higher than the area ratio of the fluorite transparent substrates used for the incident- and exit-side polarizing plates arranged in the optical paths of the remaining band light components to the polarizers bonded to the transparent substrates. However, the area ratio of the transparent substrates of the incident- and exit-side polarizing plates arranged in the optical path of the green- or blue-band light component, for which the heat load increases due to the cooling air channel or the like, may be made higher than those for the remaining band light components.

In addition, of the incident- and exit-side polarizing plates, only the area ratio of the transparent substrate of a polarizing plate with a high heat load to a polarizer bonded to the transparent substrate may be high.

The material of the transparent substrate is not limited to fluorite. A glass (or sapphire) transparent substrate may be used depending on the degree of heat load. In this case as well, when the area ratio is increased by about 20%, the difference becomes conspicuous.

In the above-described embodiment, the area of a transparent substrate is changed in accordance with heat load whereby the heat of the polarizing plate can be effectively transmitted to the transparent substrate and efficiently radiated by the transparent substrate.

Combinations of heat load and the materials and area ratios of transparent substrates when one of a plurality of transparent substrates is formed from a material different from that of the remaining transparent substrates will be described with reference to FIGS. 9A and 9B and FIGS. 10A and 10B. Two or three kinds of materials are used.

Figure 9:
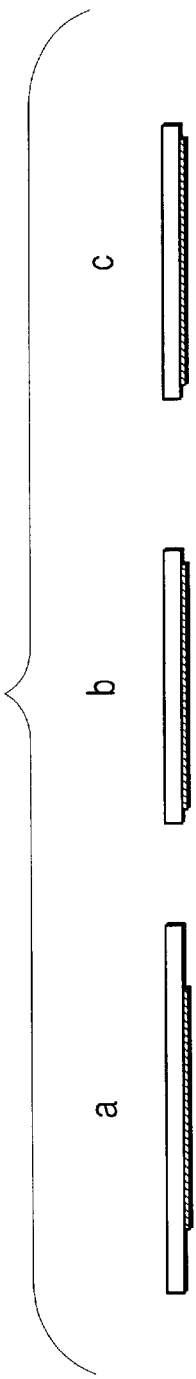
FIGS. 9A and 9B are views showing combinations of heat load and the materials and area ratios of transparent substrates in the projecting image display apparatus according to the second embodiment of the present invention.

Referring to FIG. 9A, incident- or exit-side polarizing plates a, b, and c are arranged in three optical paths of light components separated into three colors, respectively. For each polarizing plate, a polarizer is bonded to a transparent substrate.

Assume that the heat load on the respective polarizing plates increases in an order of a, b, and c (in the polarizing plates a, b, and c, the polarizing plate a has the highest heat load, and the polarizing plate c has the lowest heat load). The area of the transparent substrate of the polarizing plate a is larger (e.g., larger by 1.2 times or more) than the areas of the transparent substrates of the polarizing plates b and c.

FIG. 9B shows effective combinations when two or more kinds of materials are used for transparent substrates with the above arrangement. FIG. 9B shows a table of combinations when materials A and B (heat conductivity: A>B) are employed for the transparent substrates of the polarizing plates a, b, and c shown in FIG. 9A. As one case, sapphire is used as the material A, and fluorite (and/or glass) is used as the material B. As another case, sapphire (and/or fluorite) is used as the material A, and glass is used as the material B. There are choices of combinations 1 to 4. An optimum combination is selected in accordance with the situation of heat load or the degree of freedom in design. For example, in combination 2, the transparent substrate used for the polarizing plate a is made of sapphire, i.e., the material A, and the transparent substrates used for the polarizing plates b and c are made of fluorite (or glass), i.e., the material B. Alternatively, the transparent substrate used for the polarizing plate a is made of sapphire, i.e., the material A, the transparent substrate used for the polarizing plate b is made of fluorite, i.e., the material B, and the transparent substrate used for the polarizing plate c is made of glass, i.e., the material B.

As described above, if the heat load on a given polarizing plate is very high, a sapphire substrate is used only for the transparent substrate of that polarizing,plate, and the area ratio is increased. With this arrangement, the polarizing plate can reliably stand the high heat load.

Combinations when the area ratios of transparent substrates to polarizers are high in two optical paths will be described next.

Figure 10:
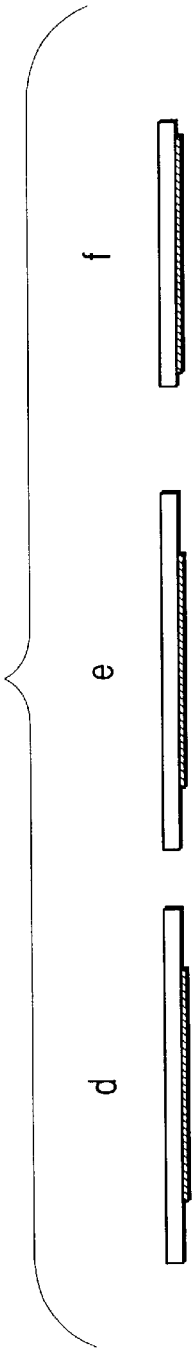
FIGS. 10A and 10B are views showing other combinations of heat load and the materials and area ratios of transparent substrates in the projecting image display apparatus according to the second embodiment of the present invention.

Referring to FIG. 10A, incident- or exit-side polarizing-.plates d, e, and f are arranged in three optical paths of light components separated into three colors, respectively. For each polarizing plate, a polarizer is bonded to a transparent substrate.

Assume that the heat load on the respective polarizing plates increases in an order of d, e, and f (in the polarizing plates d, e and f, the polarizing plate d has the highest heat load, and the polarizing plate f has the lowest heat load). The area of the transparent substrates of the polarizing plates d and e is larger (e.g., larger by 1.2 times or more) than the area of the transparent substrate of the polarizing plate f.

FIG. 10B shows effective combinations when two or more kinds of materials are used for transparent substrates with the above arrangement. FIG. 10B shows a table of combinations when materials C and D (heat conductivity: C>D) are employed for the transparent substrates of the polarizing plates d, e, and f shown in FIG. 10A. As one case, sapphire is used as the material C, and fluorite (and/or glass) is used as the material D. As another case, sapphire (and/or fluorite) is used as the material C, and glass is used as the material D. There are choices of combinations 5 to 8. An optimum combination is selected in accordance with the situation of heat load or the degree of freedom in design. For example, in combination 6, the transparent substrate used for the polarizing plate d is made of sapphire, i.e., the material C, and the transparent substrates used for the polarizing plates e and f are made of fluorite (or glass), i.e., the material D. Alternatively, the transparent substrate used for the polarizing plate d is made of sapphire, i.e., the material C, the transparent substrate used for the polarizing plate e is made of fluorite (or glass), i.e., the material D, and the transparent substrate used for the polarizing plate f is made of glass (or fluorite), i.e., the material D.

In the above-described embodiment, the material of a transparent substrate is selected, and the area of the transparent substrate is changed in accordance with heat load whereby the heat of the polarizing plate can be effectively transmitted to the transparent substrate and efficiently radiated by the transparent substrate.

Figure 11:
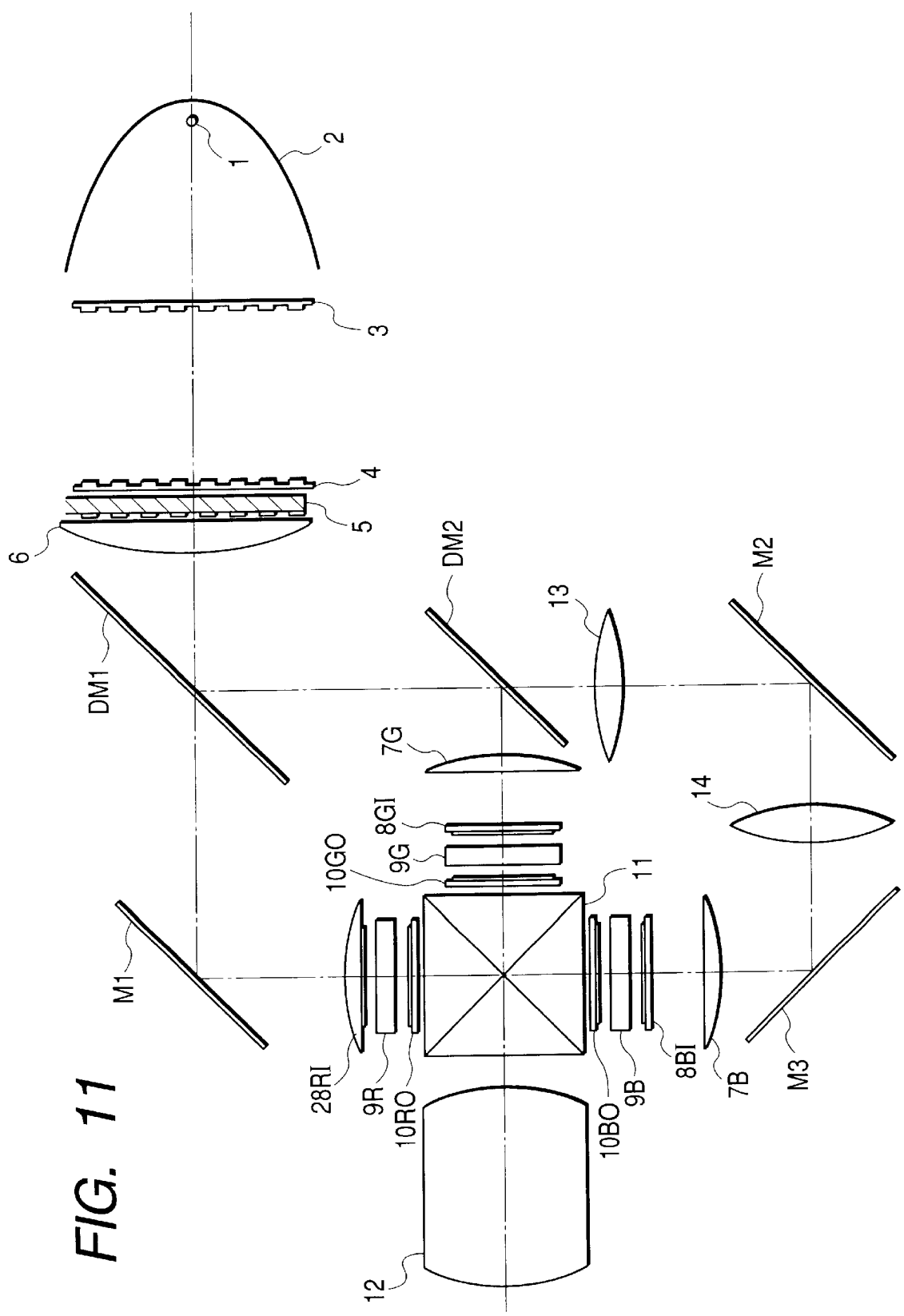
FIG. 11 is a view showing the optical arrangement of a projecting image display apparatus (projector apparatus) according to the third embodiment of the present invention.

FIG. 11 shows the optical arrangement of a projecting image display apparatus (projector apparatus) according to the third embodiment of the present invention. The same reference numerals as in the first embodiment denote the same components in the third embodiment.

Referring to FIG. 11, white light emitted from a light source section 1 of an ultrahigh-pressure mercury-vapor lamp is reflected by a reflector 2 and transmitted through fly-eye lenses 3 and 4. The direction of polarization is aligned through a PS conversion element 5 by a mirror which separates light into p-polarized light and s-polarized light and a λ/2-plate which changes the polarization direction. The light that emerges from the PS conversion element 5 passes through a condenser lens 6 and the like. After that, a dichroic mirror DM1 passes a red-band light component and reflects green- and blue-band light components. The blue-band light component is transmitted through a dichroic mirror DM2. The green-band light component is reflected by the dichroic mirror DM2. With this arrangement, the illumination light is separated into the light components in the red, green, and blue bands. The dichroic mirrors form a color separation optical system.

Each color light component becomes incident on a corresponding one of liquid crystal display elements 9R, 9G, and 9B and is modulated. The color light components are synthesized by a dichroic prism 11 serving as a color synthesis optical system and then projected onto a projection surface (screen) (not shown) by a projecting lens 12 serving as a projecting optical system. Each of the above liquid crystal display elements is an image forming panel such as a liquid crystal display panel. A transmission-type image forming panel for passing light to form an image is used.

Each color band will be described in more detail. The red-band light component transmitted through the dichroic mirror DM1 is changed in its optical path by 90° by a reflecting mirror M1, passes through a field lens 28RI with polarizer, and becomes incident on the liquid crystal display element 9R. The liquid crystal display element 9R is driven in accordance with image information supplied from an image information supply apparatus (e.g., a personal computer, TV, video tape recorder, or DVD player) (not shown) and modulates the red-band light component incident thereon.

The modulated red-band light component strikes an exit-side polarizing plate 10RO and dichroic prism 11 in this order. The optical path is changed by 90° by the dichroic prism 11. Then, the light component becomes incident on the projecting lens 12. The dichroic prism 11 is a so-called cross dichroic prism formed by bonding four prisms with adhesive such that it has an almost cross-shaped wavelength selection reflecting (dichroic) layer. In place of the cross dichroic prism, a so-called 3P (3-piece) or a 4P (4-piece) prism formed by bonding three or four prisms having different shapes may be used. The cross dichroic prism, 3P (3-piece) prism, or 4P (4-piece) prism constructs a color synthesis optical system.

On the other hand, the green- and blue-band light components reflected and changed in their operation paths by 90° by the dichroic mirror DM1 become incident on the dichroic mirror DM2. The dichroic mirror DM2 has a characteristic for reflecting a green-band light component G. Hence, the green-band light component is reflected and changed in its optical path by 90° by the dichroic mirror DM2, transmitted through a field lens 7G, and becomes incident on an incident-side polarizing plate 8GI and liquid crystal display element 9G. The liquid crystal display element 9G is driven in accordance with image information supplied from an image information supply apparatus (not shown) and modulates the green-band light component incident thereon.

The modulated green-band light component strikes an exit-side polarizing plate 10GO and dichroic prism 11 in this order, passes through the dichroic prism 11, and becomes incident on the projecting lens 12.

The blue-band light component transmitted through the dichroic mirror DM2 is transmitted through a condenser lens 13, relay lens 14, reflecting mirrors M2 and M3, and field lens 7B and becomes incident on an incident-side polarizing plate 8BI and liquid crystal display element 9B. The liquid crystal display element 9B is driven in accordance with image information supplied from an image information supply apparatus (not shown) and modulates the blue-band light component incident thereon.

The modulated blue-band light component strikes an exit-side polarizing plate 10BO and dichroic prism 11 in this order, is changed in its optical path by 90° by the dichroic prism 11, and becomes incident on the projecting lens 12.

The light components in the respective color bands, which are synthesized by the dichroic prism 11, are projected onto the projection surface (screen) (not shown) by the projecting lens 12 and displayed as an enlarged image.

When the color purity of the red band is reduced (when another color band light near the red band is also included), a bright image is obtained. In this case, however, the heat load on the polarizing plate arranged in the optical path of the red band increases.

Figure 12:
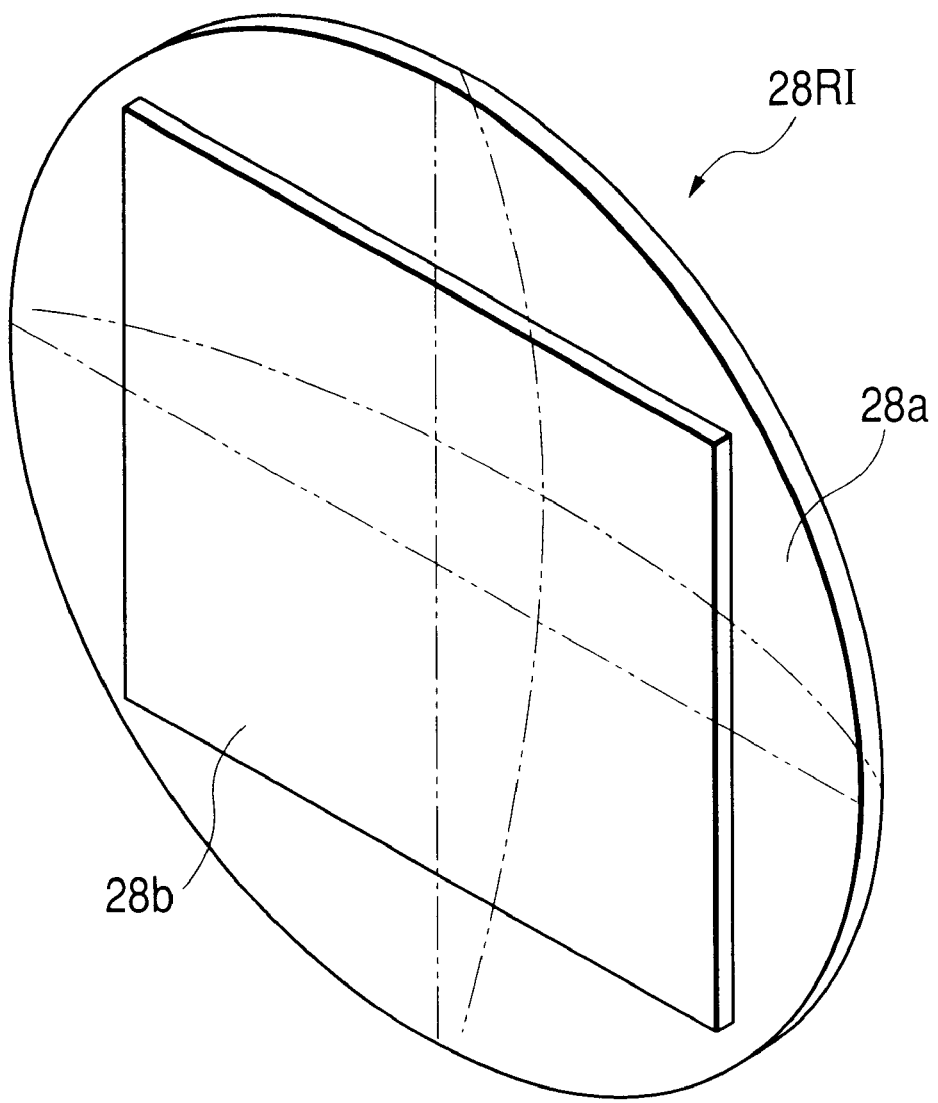
FIG. 12 is a perspective view showing the structure of a field lens having a red-band polarizer in the projecting image display apparatus according to the third embodiment.

A measure against this will be described below. As shown in FIG. 12, the field lens 28RI used as the transparent substrate of the polarizing plate which passes a red-band light component is formed by bonding a polarizer 28b to the exit plane of a lens section (corresponding to a transparent substrate) 28a such that a predetermined polarizing characteristic can be exhibited. The field lens and transparent substrate are formed from the same material, i.e., fluorite.

The field lens serving as one transparent substrate has a shape different from the planar shape of each of the remaining transparent substrates. The incident surface of the lens section 28a of the field lens is formed from a spherical surface (alternatively, a convex surface, concave surface, aspherical surface, or free-form surface may be possible). Its size or thickness at the center can be relatively freely set. That is, the surface area of one transparent substrate is larger than those of the remaining transparent substrates. In this embodiment, the shape (the area or thickness of the lens 28a) of the field lens serving as one transparent substrate is set to be different (larger in area or thickness) from the planar shape of the transparent substrate of the incident-side polarizing plate 8GI or exit-side polarizing plate 10GO which passes the green-band light component or the incident-side polarizing plate 8BI or exit-side polarizing plate 10BO which passes the blue-band light component. That is, the field lens serving as one transparent substrate has a shape different from those of the remaining transparent substrates (the surface area of one transparent substrate (field lens) is larger than those of the remaining transparent substrates).

In this embodiment as well, when the shape of the transparent substrate (field lens 28RI) to which an incident-side polarizer which passes the red-band light component is bonded is appropriately optimized on the basis of the relationship shown in FIG. 3 of the first embodiment or FIG. 8 of the second embodiment, the heat load can be sufficiently relaxed even when fluorite is used as the material of the transparent substrate (lens).

In this embodiment, an incident-side polarizer is bonded to the field lens serving as a transparent substrate arranged in the optical path of the red-band light component, and the shape of the field lens is optimized. However, the transparent substrate of the green or blue band, for which the heat load increases due to the cooling air channel or the like, may serve as a field lens, and a polarizer may be bonded to the field lens.

Additionally, in this embodiment, a polarizer is bonded to a field lens made of fluorite, and the shape of the field lens is optimized. Depending on the degree of heat load, a polarizer may be boned to a glass field lens, and the shape of the field lens may be optimized.

In the above embodiment, as the shape of the transparent substrate, the field lens has a planar surface on one side and a spherical lens section on the other side. However, if the surface area becomes larger than that of a planar transparent substrate, and the display image to be projected is not affected, the polarizer may be held by a planar surface on one side, and the surface on the other side may be formed into a wave shape or grating shape such that the surface area becomes larger than a planar surface.

Combinations of heat load and the materials and shapes of transparent substrates when one of a plurality of transparent substrates is formed from a material different from that of the remaining transparent substrates will be described with reference to FIGS. 13A and 13B and FIGS. 14A and 14B. Two or three kinds of materials are used.

Figure 13:
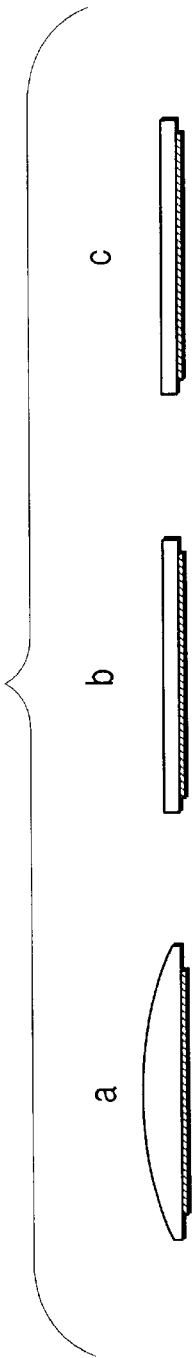
FIGS. 13A and 13B are views showing combinations of heat load and the materials and shapes of transparent substrates in the projecting image display apparatus according to the third embodiment of the present invention.

Referring to FIG. 13A, incident- or exit-side polarizing plates a, b, and c are arranged in three optical paths of light components separated into three colors, respectively. For each polarizing plate, a polarizer is bonded to a transparent substrate.

Assume that the heat load on the respective polarizing plates increases in an order of a, b, and c (in the polarizing plates a, b, and c, the polarizing plate a has the highest heat load, and the polarizing plate c has the lowest heat load). The transparent substrate of the polarizing plate a has a shape different from the planar shapes of the polarizing plates b and c and has a larger surface area and volume (a field lens in which one surface has a planar shape and the other surface has a spherical shape is used).

FIG. 13B shows effective combinations when two or more kinds of materials are used for transparent substrates with the above arrangement. FIG. 13B shows a table of combinations when materials A and B (heat conductivity: A>B) are employed for the transparent substrates of the polarizing plates a, b, and c shown in FIG. 13A. As one case, sapphire is used as the material A, and fluorite (and/or glass) is used as the material B. As another case, sapphire (and/or fluorite) is used as the material A, and glass is used as the material B. There are choices of combinations 1 to 4. An optimum combination is selected in accordance with the situation of heat load or the degree of freedom in design. For example, in combination 2, the transparent substrate used for the polarizing plate a is made of sapphire, i.e., the material A, and the transparent substrates used for the polarizing plates b and c are made of fluorite (or glass), i.e., the material B. Alternatively, the transparent substrate used for the polarizing plate a is made of sapphire, i.e., the material A, the transparent substrate used for the polarizing plate b is made of fluorite, i.e., the material B, and the transparent substrate used for the polarizing plate c is made of glass, i.e., the material B.

As described above, if the heat load on a given polarizing plate is very high, sapphire is used only for that field lens, and the shape is optimized (the surface area is increased). With this arrangement, the field lens (the transparent substrate of the polarizing plate) can reliably stand the high heat load.

Combinations when the shapes of transparent substrates in two optical paths are different from that in the remaining optical path will be described next.

Figure 14:
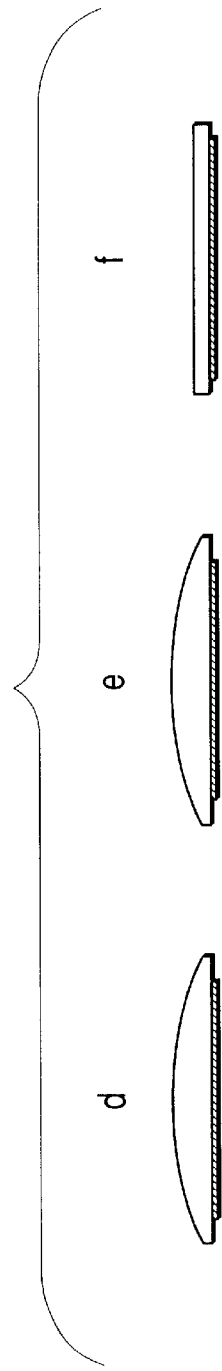
FIGS. 14A and 14B are views showing other combinations of heat load and the materials and shapes of transparent substrates in the projecting image display apparatus according to the third embodiment of the present invention.
Figure 15:
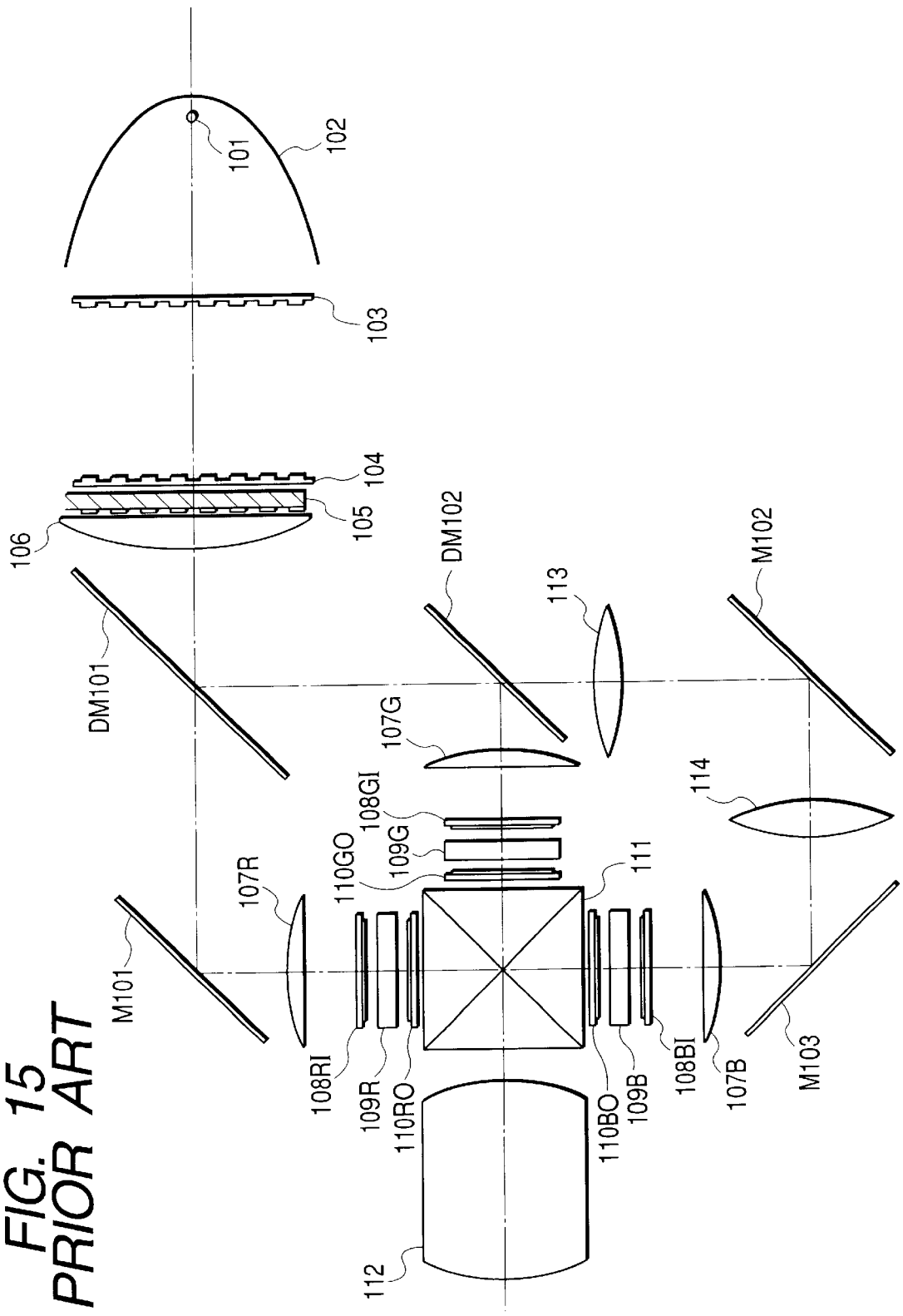
FIG. 15 is a view showing the optical arrangement of a conventional projecting image display apparatus.
Figure 16:
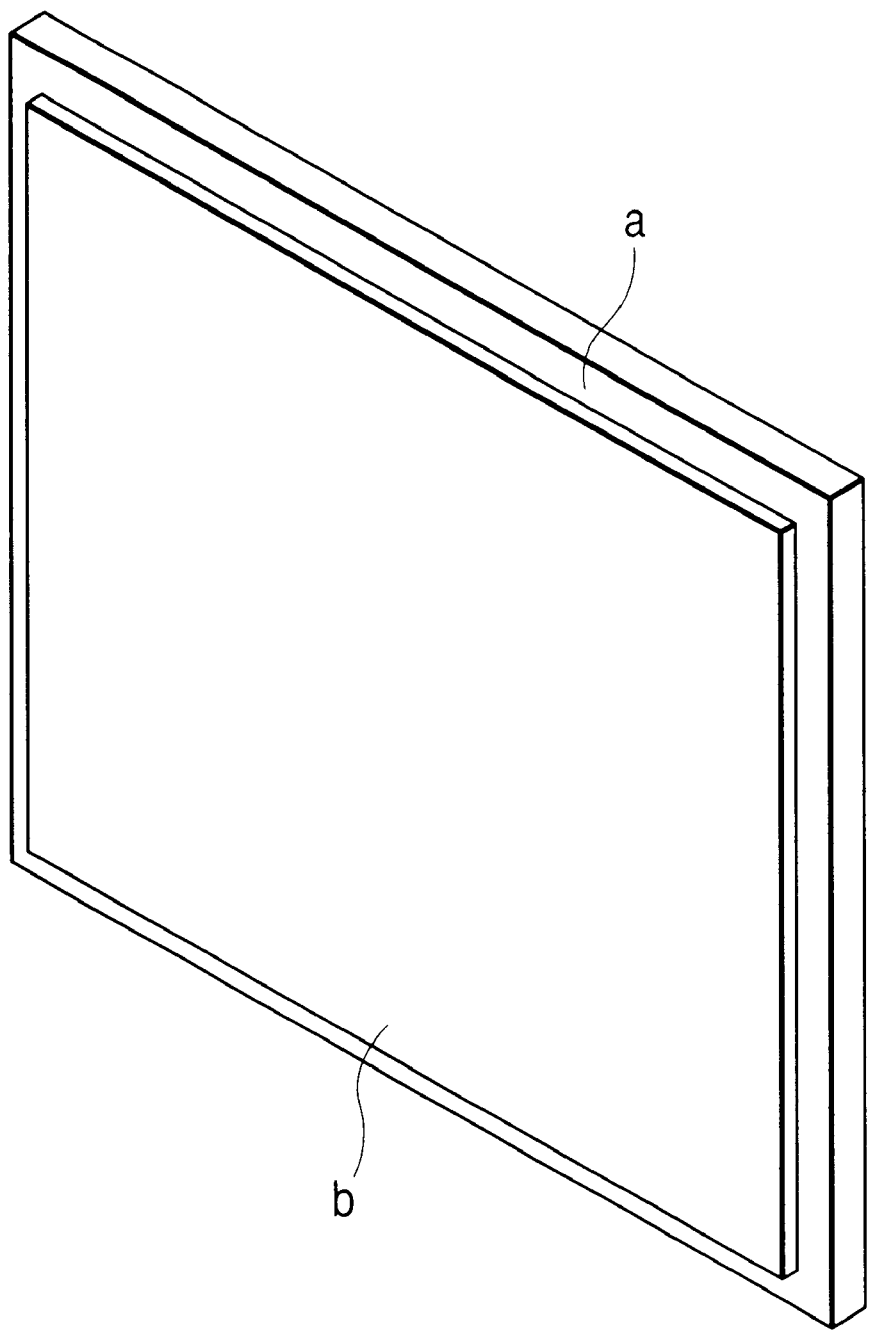
FIG. 16 is a perspective view showing the structure of a polarizing plate in the conventional projecting image display apparatus.

Referring to FIG. 14A, incident- or exit-side polarizing plates d, e, and f are arranged in three optical paths of light components separated into three colors, respectively. For each polarizing plate, a polarizer is bonded to a transparent substrate.

Assume that the heat load on the respective polarizing plates increases in an order of d, e, and f (in the polarizing plates d, e and f, the polarizing plate d has the highest heat load, and the polarizing plate f has the lowest heat load). The transparent substrates of the polarizing plates d and e have a shape different from the planar shape of the polarizing plate f and has a larger surface area and volume (field lenses in each of which one surface has a planar shape and the other surface has a spherical shape are used).

FIG. 14B shows effective combinations when two or more kinds of materials are used for transparent substrates with the above arrangement. FIG. 14B shows a table of combinations when materials C and D (heat conductivity: C>D) are employed for the transparent substrates of the polarizing plates d, e, and f shown in FIG. 14A. As one case, sapphire is used as the material C, and fluorite (and/or glass) is used as the material D. As another case, sapphire (and/or fluorite) is used as the material C, and glass is used as the material D. There are choices of combinations 5 to 8. An optimum combination is selected in accordance with the situation of heat load or the degree of freedom in design. For example, in combination 6, the transparent substrate used for the polarizing plate d is made of sapphire (or fluorite), i.e., the material C, and the transparent substrates used for the polarizing plates e and f are made of fluorite (or glass), i.e., the material D. Alternatively, the transparent substrate used for the polarizing plate d is made of sapphire, i.e., the material C, the transparent substrate used for the polarizing plate e is made of fluorite (or glass), i.e., the material D, and the transparent substrate used for the polarizing plate f is made of glass (or fluorite), i.e., the material D.

In the above-described embodiment, the material of a transparent substrate is selected, and the shape (surface area) of the transparent substrate is changed in accordance with heat load whereby the heat of the polarizing plate can be effectively transmitted to the transparent substrate and efficiently radiated by the transparent substrate.

In the above-described embodiments, in a projector apparatus in which a transmission-type image forming panel such as a liquid crystal display panel for passing light to form an image is used as an image forming panel, a transparent substrate that holds a polarizer in the above-described embodiments is used. However, a transparent substrate that holds a polarizer in the above-described embodiments may be used in a projector apparatus in which a reflection-type image forming panel such as a liquid crystal display panel for reflecting light to form an image is used. In this case, the optical system uses a color separation optical system, color synthesis optical system, and a color separation/synthesis optical system having both functions of color separation and color synthesis.

As has been described above, according to each of the above-described embodiments, the material of a transparent substrate is selected, and the surface area (thickness, area, or volume) of the transparent substrate is changed in accordance with heat load whereby the heat of the polarizing plate can be effectively transmitted to the transparent substrate and efficiently radiated by the transparent substrate. The heat load on the polarizing plate can be effectively and sufficiently relaxed. Hence, the cost can be reduced while properly preventing any degradation in image quality due to heat.

What is claimed is:

1. A projector apparatus comprising:
   a color separation optical system which separates illumination light into a plurality of color light components;
   a plurality of image forming panels illuminated with the plurality of color light components, respectively;
   a color synthesis optical system which synthesizes the light components from said plurality of image forming panels illuminated;
   a projecting optical system which projects light from said color synthesis optical system; and
   transparent substrates each arranged on at least one of incident and exit surface sides of said plurality of image forming panels, each of said transparent substrates holding a polarizer,
   wherein a thickness of at least one of said plurality of transparent substrates is larger than those of the remaining transparent substrates.

2. An apparatus according to claim 1, wherein the thickness of the at least one transparent substrate is not less than 1.2 times larger than those of the remaining transparent substrates.

3. An apparatus according to claim 1, wherein said plurality of transparent substrates are essentially formed from a material selected from the group consisting of sapphire, fluorite, and glass.

4. An apparatus according to claim 1, wherein said at least one of said plurality of transparent substrates and the remaining transparent substrates are essentially formed from different materials selected from the group consisting of sapphire, fluorite, and glass.

5. An apparatus according to claim 1, wherein said at least one transparent substrate of said plurality of transparent substrates is essentially formed from a material selected from the group consisting of sapphire, fluorite, and glass, and the remaining transparent substrates are essentially formed from one or two materials which are different from the material of said at least one transparent substrate and are selected from the group consisting of sapphire, fluorite, and glass.

6. A projector apparatus comprising:
   a color separation optical system which separates illumination light into a plurality of color light components;
   a plurality of image forming panels illuminated with the plurality of color light components, respectively;
   a color synthesis optical system which synthesizes the light components from said plurality of image forming panels illuminated;
   a projecting optical system which projects light from said color synthesis optical system; and
   transparent substrates each arranged on at least one of incident and exit surface sides of said plurality of image forming panels, each of said transparent substrates holding a polarizer,
   wherein an area ratio of at least one of said plurality of transparent substrates to a polarizer held by the transparent substrate is larger than area ratios of the remaining transparent substrates to polarizers held by the remaining transparent substrates.

7. An apparatus according to claim 6, wherein the area ratio of the at least one transparent substrate to the polarizer held by said at least one transparent substrate is not less than 1.2 times larger than the area ratios of the remaining transparent substrates to the polarizers held by the remaining transparent substrates.

8. An apparatus according to claim 6, wherein said plurality of transparent substrates are essentially formed from a material selected from the group consisting of sapphire, fluorite, and glass.

9. An apparatus according to claim 6, wherein said at least one of said plurality of transparent substrates and the remaining transparent substrates are essentially formed from different materials selected from the group consisting of sapphire, fluorite, and glass.

10. An apparatus according to claim 6, wherein said at least one transparent substrates of said plurality of transparent substrates is essentially formed from a material selected from the group consisting of sapphire, fluorite, and glass, and the remaining transparent substrates are essentially formed from one or two materials which are different from the material of said at least one transparent substrate and are selected from the group consisting of sapphire, fluorite, and glass.

11. A projector apparatus comprising:

a color separation optical system which separates illumination light into a plurality of color light components;

a plurality of image forming panels illuminated with the plurality of color light components, respectively;

a color synthesis optical system which synthesizes the light components from said plurality of image forming panels illuminated;

a projecting optical system which projects light from said color synthesis optical system; and transparent substrates each arranged on at least one of incident and exit surface sides of said plurality of image forming panels, each of said transparent substrates holding a polarizer, wherein an area of at least one of said plurality of transparent substrates is larger than those of the remaining transparent substrates.

12. An apparatus according to claim 11, wherein the area of the at least one transparent substrate is not less than 1.2 times larger than those of the remaining transparent substrates.

13. An apparatus according to claim 11, wherein said plurality of transparent substrates are essentially formed from a material selected from the group consisting of sapphire, fluorite, and glass.

14. An apparatus according to claim 11, wherein said at least one of said plurality of transparent substrates and the remaining transparent substrates are essentially formed from different materials selected from the group consisting of sapphire, fluorite, and glass.

15. An apparatus according to claim 11, wherein said at least one transparent substrate of said plurality of transparent substrates is essentially formed from a material selected from the group consisting of sapphire, fluorite, and glass, and the remaining transparent substrates are essentially formed from one or two materials which are different from the material of said at least one transparent substrate and are selected from the group consisting of sapphire, fluorite, and glass.

16. A projector apparatus comprising:

a color separation optical system which separates illumination light into a plurality of color light components;

a plurality of image forming panels illuminated with the plurality of color light components, respectively;

a color synthesis optical system which synthesizes the light components from said plurality of image forming panels illuminated;

a projecting optical system which projects light from said color synthesis optical system; and transparent substrates each arranged on at least one of incident and exit surface sides of said plurality of image forming panels, each of said transparent substrates holding a polarizer, wherein a surface area of at least one of said plurality of transparent substrates is larger than those of the remaining transparent substrates.

17. An apparatus according to claim 16, wherein the at least one transparent substrate has a shape with a curvature, and the remaining transparent substrates have a planar shape.

18. An apparatus according to claim 16, wherein said plurality of transparent substrates are essentially formed from a material selected from the group consisting of sapphire, fluorite, and glass.

19. An apparatus according to claim 16, wherein said at least one of said plurality of transparent substrates and the remaining transparent substrates are essentially formed from different materials selected from the group consisting of sapphire, fluorite, and glass.

20. An apparatus according to claim 16, wherein said at least one transparent substrate of said plurality of transparent substrates is essentially formed from a material selected from the group consisting of sapphire, fluorite, and glass, and the remaining transparent substrates are essentially formed from one or two materials which are different from the material of said at least one transparent substrate and are selected from the group consisting of sapphire, fluorite, and glass.

* * * * *

UNITED STATES PATENT AND TRADEMARK OFFICE
CERTIFICATE OF CORRECTION

PATENT NO.     : 6,619,803 B2
DATED          : September 16, 2003
INVENTOR(S)    : Hidefuni Notagashira It is certified that error appears in the above-identified patent and that said Letters Patent is hereby corrected as shown below:

Column 1,
Line 39, delete "dolor" and insert -- color --

Column 16,
Line 4, delete "boned" and insert -- bonded --

Signed and Sealed this

Third Day of May, 2005

JON W. DUDAS
*Director of the United States Patent and Trademark Office*